United States Patent Office 3,360,451
Patented Dec. 26, 1967

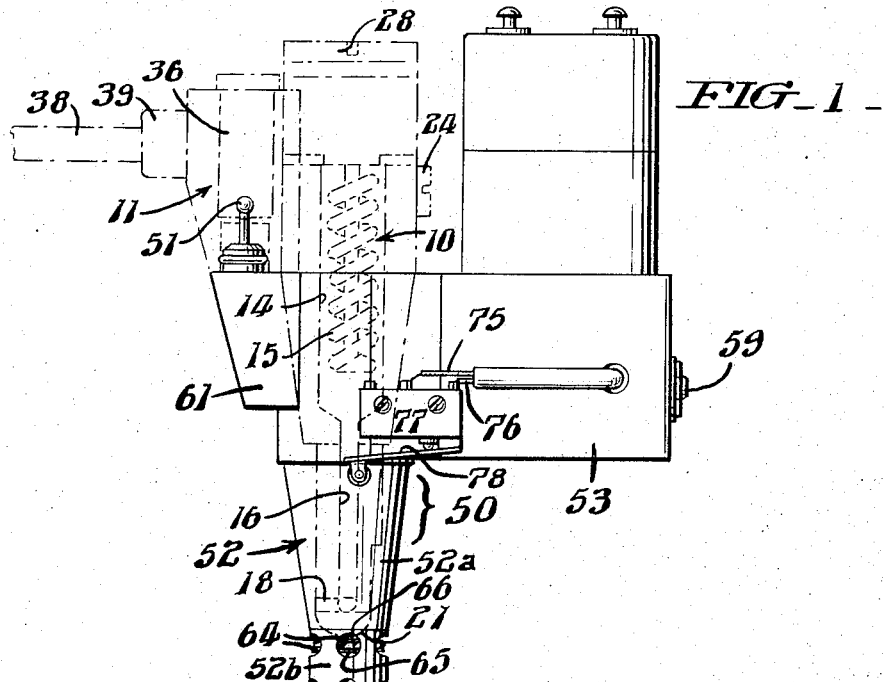
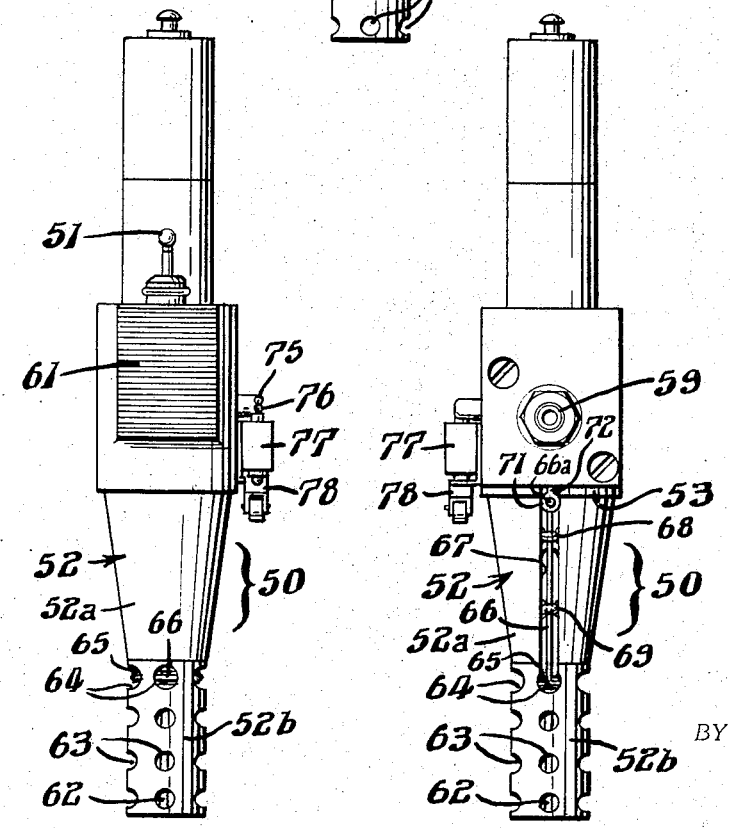

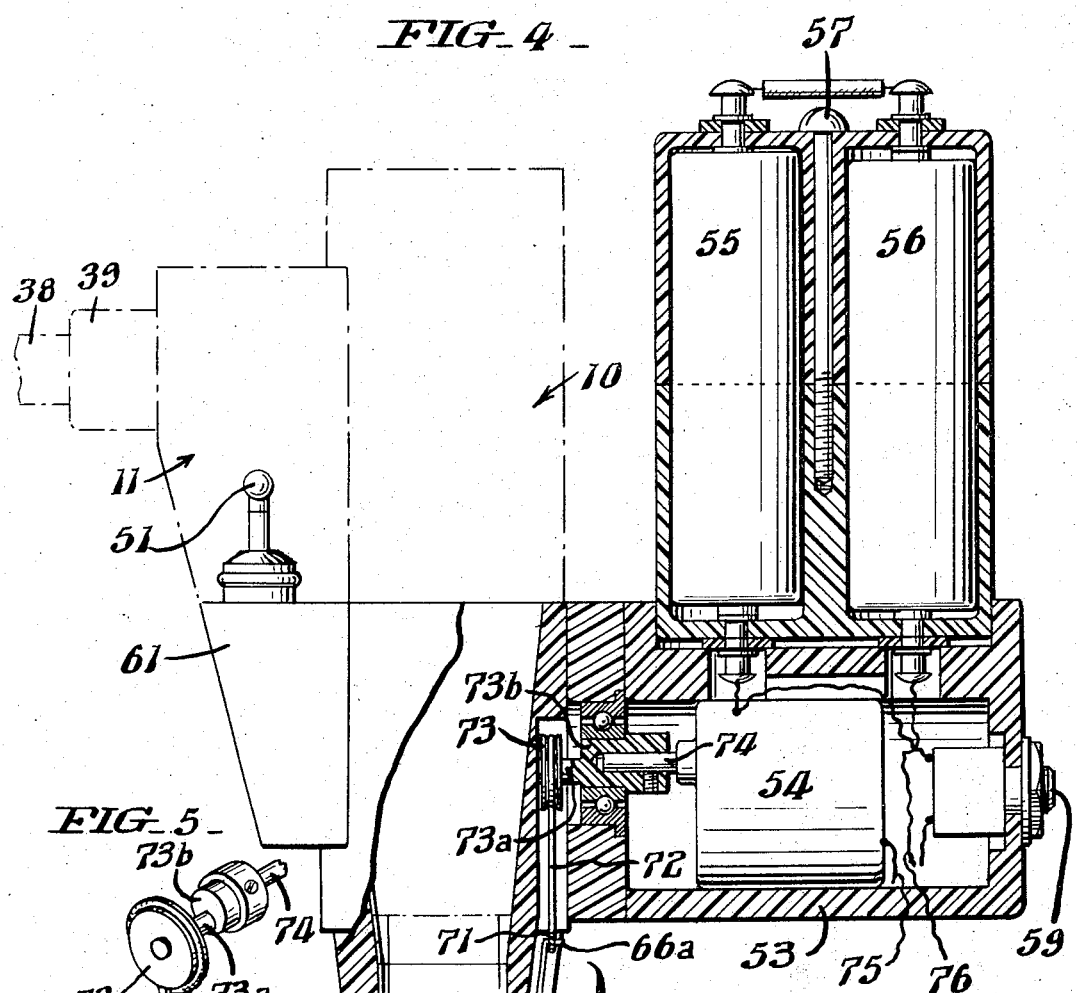

3,360,451
AGITATOR FOR DISSOLVED OXYGEN PROBE
Vernon T. Stack, Jr., Chadds Ford, Pa., assignor to Roy F. Weston, Inc., Newtown Square, Pa., a corporation of Pennsylvania
Filed Feb. 26, 1965, Ser. No. 435,646
8 Claims. (Cl. 204—195)

This invention relates to a dissolved oxygen analyzer, which is a device for determining the amount of dissolved oxygen in gas streams and in liquids. Such a device includes a polarographic dissolved oxygen probe and readout instrumentation. The probe is separated from the sample by a semipermeable membrane which is permeable to oxygen. The output of the probe is read directly.

Determination of dissolved oxygen in liquids requires a fixed degree of turbulence, and the object of the present invention is to provide an agitator for use with a dissolved oxygen probe to provide the required fixed amount of turbulence. The agitator provided by the present invention is especially suitable for use in B.O.D. bottles to provide dissolved oxygen measurement of greater precision.

The invention will become clear from the following description of a preferred form of agitator illustrated in the drawing in which:

FIG. 1 is a front elevational view of a probe shield having mounted therein the agitator of the present invention. The shield is shown attached to a dissolved oxygen probe. The probe is shown in dot-and-dash lines, the shield in solid lines;

FIG. 2 is a side elevational view looking in from the left in FIG. 1;

FIG. 3 is a side elevational view looking in from the right in FIG. 1;

FIG. 4 is an enlarged front elevational view, in section, of the probe shield containing the agitator; the probe is indicated in dot-and-dash line; and FIG. 5 is a detailed view of the agitator and agitator drive.

The dissolved oxygen probe will be described first, after which the shield-mounted agitator of the present invention will be described.

Referring now to the drawings, and particularly FIGS. 1 and 4 wherein the dissolved oxygen probe is shown in dotted lines, the probe is shown to include a probe body 10 and a jack housing 11 both of which may preferably be formed of a chemical-resistant plastic such as polyvinylchloride. The probe body 10 is provided with a cavity having an upper chamber 14 for receiving a lead rod and coil 15 which functions as the anode, and a lower chamber 16 of smaller diameter which extends downwardly toward the rounded tip of the probe. Chambers 16 and 14 are filled with an electrolyte.

The lower chamber 16 is provided with radial passages 18 which extend from the lower chamber 16 to the external surface of the probe and provide communication between the electrolyte in the chamber 16 and the electrolyte on the external surface of the probe inside a semipermeable membrane 22.

A curved platinum tip 21 is secured to the external surface of the tip of the probe body and functions as a cathode of the probe assembly. The plastic membrane 22 is permeable to oxygen and other dissolved gases but impervious to the other constituents of the water or other liquid which is to be analyzed. Membrane 22 is placed around the tip end of the probe so as to fit tightly, but not so tightly as to prevent an electrolyte path from the cathode to the radial passage 18. Membrane 22 may preferably be Teflon, but may be polyethylene or other suitable material.

The cavity of the probe body is filled completely with electrolyte, preferably potassium iodide. Additional electrolyte may be added, as needed, through a threaded porthole closed normally by nylon screw 24. An internally threaded service cap 28 closes the probe body at its upper end.

The jack housing 11 includes a jack 36 to which an electrical cable 38 is connected, constrained by cord restrainer 39. Jack 36 receives the plug 51 which is part of the agitator 50 which will now be described. The purpose of the agitator is to provide a fixed amount of turbulence in the immediate vicinity of the platinum tip 21 of the probe.

The dissolved oxygen probe briefly described above is a preferred form of probe which is described and claimed in my pending application, Ser. No. 408,504, filed Nov. 3, 1964, entitled Dissolved Oxygen Probe. While the agitator about to be described is adapted particularly for use with the probe which has been illustrated and described above, it is to be understood that the agitator may be adapted for use with other types of probes.

The agitator may be mounted in a probe shield or housing 50 preferably made of a chemical-resistant plastic such as polyvinylchloride. The shield or housing is shown as having a vertically disposed barrel portion 52 and a laterally extending body portion 53 which contains the D.C. motor 54 which drives the agitator. Mounted on the upper surface of the lateral portion 53, and secured thereto as by screw 57, are a pair of batteries 55, 56 which may be 1½-volt "Penlite" cells connected in series. The right side portion of the shield, a viewed in the drawing, is provided with a jack 59 to permit connection to larger batteries, where desired.

On the opposite side of the barrel 52 is a body portion 61 supporting a plug 51 which is inserted into and received by the jack 36 of the jack housing 11 of the probe.

The vertically-disposed barrel portion 52 has a tapered upper portion 52a and a cylindrical lower portion 52b. The bore of the tapered barrel 52a is of a size adapted to receive the depending body portion of the probe 10, as depicted in FIGS. 1 and 4 by the dot-and-dash line representation. The lower portion 52b of the barrel serves as the housing for a temperature sensitive resistor or thermistor 62. This lower portion 52b is provided with a plurality of holes 63 to allow free flow of the fluid being tested. Somewhat larger holes 64 are provided in the agitator housing at the point where the tapered portion of the housing joins with the cylindrical lower portion. This is the point at which the platinum tip 21 of the probe is located and, as will now be described, this is the point at which the agitator disc 65 is located within the probe shield.

The agitator disc 65 is a perforated disc of polyvinylchloride or other suitable material, having a grooved periphery. In the peripheral groove and encircling the disc 65 is a support wire 66 which continues upwardly along a slot or channel 67 provided in the side of the tapered portion 52a of the barrel portion of the shield. Teflon bearings 68 and 69, cemented to the barrel, are provided to guide the wire 66 as it moves up and down.

At its upper end, the wire 66 is bent substantially at right angles, the bent portion 66a passing through the eye 71 of a push rod 72. The upper end of push rod 72 embraces a peripherally grooved Teflon bearing 73 in which is journalled the shaft 73a of an eccentric 73b fixed to and driven by the shaft 74 of motor 54. The motor 54 may be driven by any suitable means, but is shown as being driven by two 1½-volt batteries 55, 56 connected in series. The leads 76, 75, one directly from the battery and the other through the motor, are connected to a microswitch 77 having a lever switch arm 78 adapted to be lifted by the upper edge of the B.O.D. bottle when the probe assembly is inserted thereinto, thereby to close the switch and energize the motor. Energization of motor 54 is effective to drive the eccentric assembly and to cause the perforated agitator disc 65 to vibrate rapidly up and down in the zone just beyond the platinum tip 21. The speed of vibration may, for example, be 3000 cycles per minute. It is contemplated that vibration speeds in the range 1000 to 10,000 cycles per minute will be suitable.

It will be seen that the present invention provides a probe and agitator having a very compact physical relationship. The probe, probe shield, agitator disc, agitator drive, and thermistor are so integrally designed and arranged that the sensing and agitation elements can be inserted into a sample through a small opening. This is an important advantage, and adapts the device particularly for B.O.D. determinations. However, the device is not limited to such determinations, but may be used for other purposes.

Having described my invention, I claim:

1. In combination; a dissolved oxygen probe having an elongated downwardly-extending body portion having an electrode at the tip; a shield having a downwardly-extending open barrel portion and an upper laterally-extending portion; an agitator plate supported within said barrel portion of said shield just below the tip electrode of said probe; and power drive means supported by the laterally-extending portion of said shield and connected to said agitator plate for vibrating the same.

2. The combination claimed in claim 1 characterized in that said power drive means includes a motor, a drive shaft, and an eccentric mounted on said drive shaft; and means connecting said eccentric to said agitator plate.

3. The combination claimed in claim 2 further characterized in that said agitator plate is a perforated disc.

4. The combination claimed in claim 3 further characterized in that said agitator disc has a grooved periphery, and in that said means connecting said eccentric to said agitator disc includes a wire support embracing said disc and extending upwardly therefrom and connected to a connecting rod which is coupled to and driven by said eccentric, said wire support and connecting rod being supported by and within said shield, thereby to enable said downwardly-extending portion of said probe and said shield containing said agitator disc and connecting means to be insertable through a small hole into the sample to be tested.

5. The combination claimed in claim 4 further characterized in that a temperature-sensitive resistor is mounted within the barrel portion of said shield below said agitator disc.

6. The combination claimed in claim 5 further characterized in that said power drive means includes battery means supported on the laterally-extending portion of said shield, and a switch connected between said battery means and said motor.

7. In combination; a dissolved oxygen probe having an electrode at the tip; an accessory body having an upper portion and a downwardly extending lower portion covering said probe; an agitator plate supported by said accessory body just below the tip electrode of said probe; and power drive means in said upper portion of said accessory body and connected to said agitator plate for vibrating said plate.

8. The combination claimed in claim 7 further characterized in that said agitator plate is a perforated disc.

References Cited
UNITED STATES PATENTS

| | | | |
|---|---|---|---|
| 2,414,411 | 1/1947 | Marks | 204—195 |
| 2,470,741 | 5/1949 | Gordon | 204—273 |
| 2,865,832 | 12/1958 | Pitzer | 204—273 |
| 3,275,541 | 9/1966 | Strong | 204—195 |

JOHN H. MACK, *Primary Examiner.*

T. TUNG, *Assistant Examiner.*